(No Model.) 2 Sheets—Sheet 1.
W. F. WELLMAN.
MACHINE FOR CUTTING SHOE SOLES.
No. 391,287. Patented Oct. 16, 1888.
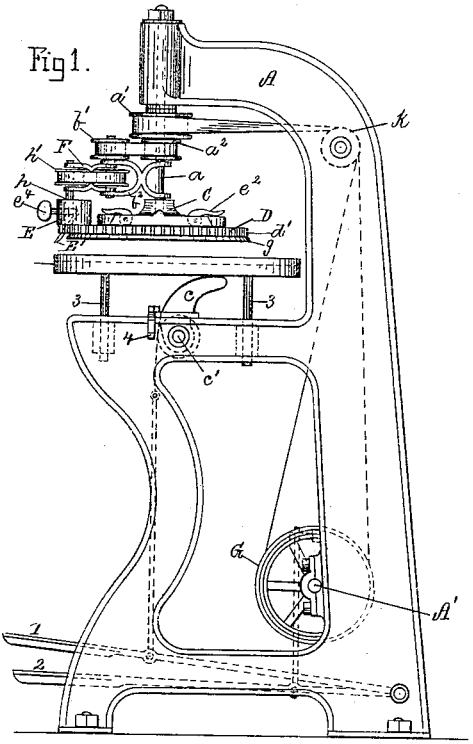
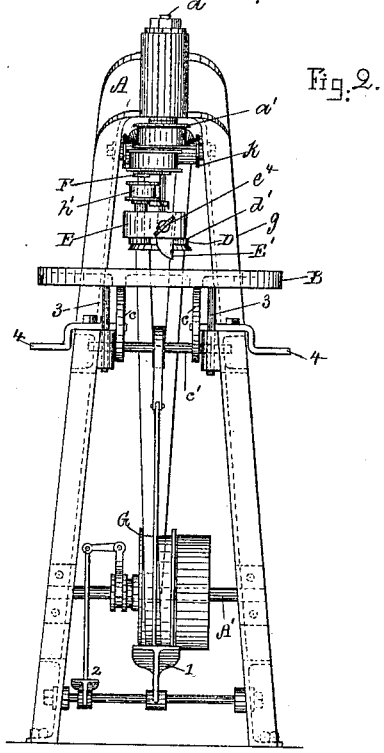
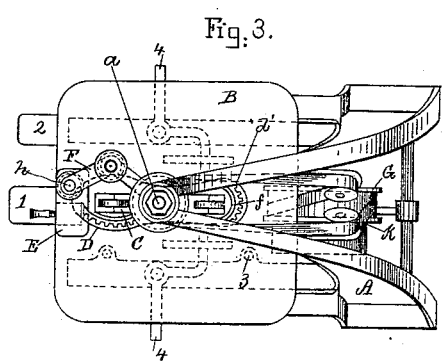
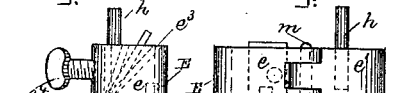
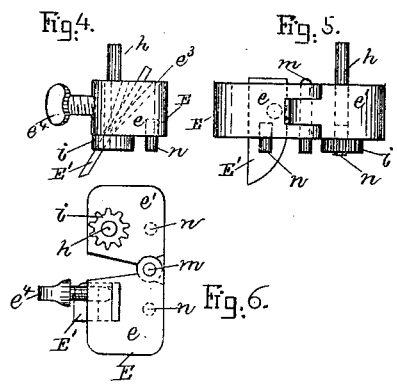
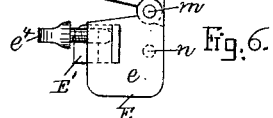
Witnesses.
Inventor
Willard F. Wellman,
by his attorney, (No Model.) 2 Sheets—Sheet 2.
W. F. WELLMAN.
MACHINE FOR CUTTING SHOE SOLES.
No. 391,287. Patented Oct. 16, 1888.
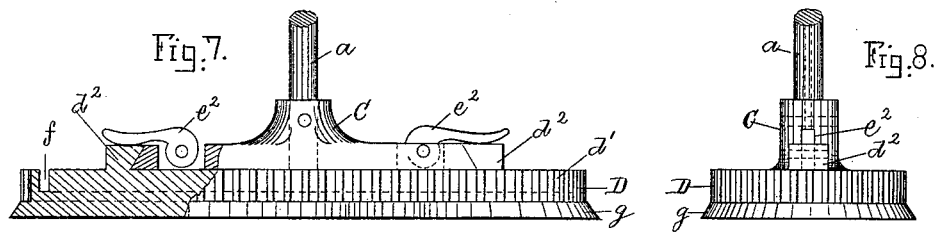
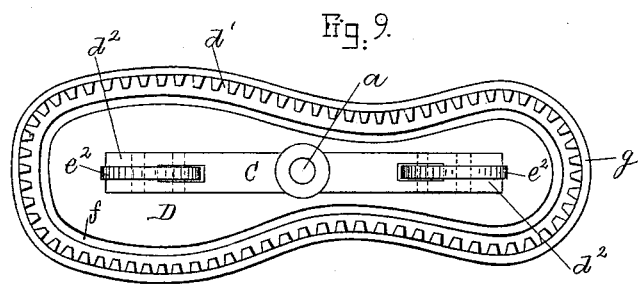
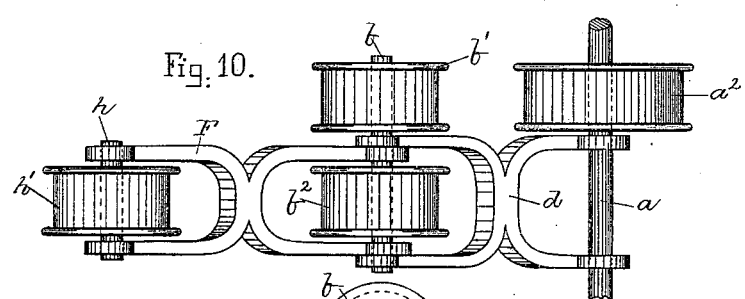
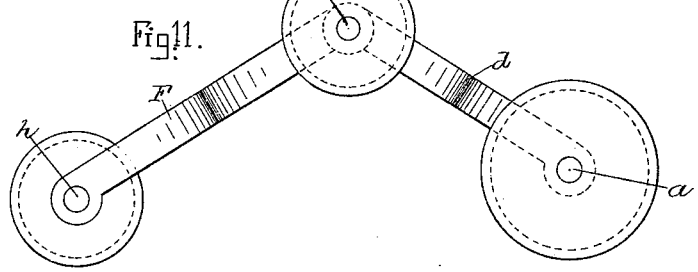
Witnesses.
Edward S. Roach
John R. Snow.
Inventor.
Willard F. Wellman,
by his attorney,

United States Patent Office.

WILLARD F. WELLMAN, OF BOSTON, MASSACHUSETTS, ASSIGNOR, BY MESNE ASSIGNMENTS, TO THE WELLMAN SOLE CUTTING MACHINE COMPANY, OF SAME PLACE.

MACHINE FOR CUTTING SHOE-SOLES.

SPECIFICATION forming part of Letters Patent No. 391,287, dated October 16, 1888.

Application filed December 3, 1887. Serial No. 256,903. (No model.)

*To all whom it may concern:*

Be it known that I, WILLARD FRANK WELLMAN, of Boston, in the county of Suffolk, in the State of Massachusetts, have invented a new and useful Machine for Cutting Shoe-Soles, of which the following is a specification, reference being had to the accompanying drawings, in which—

Figure 1 is a side elevation of a machine embodying my invention. Fig. 2 is a front elevation of the same. Fig. 3 is a plan. Fig. 4 is an end view of the preferred form of tool-carrier. Fig. 5 is a side view; Fig. 6, a plan of what is shown in Fig. 4. Fig. 7 is a side elevation, partly in section, of the sole-form; Fig. 8, an end view, and Fig. 9 a plan of what is shown in Fig. 7. Fig. 10 is a side elevation of the elbow and pulleys, and Fig. 11 a plan of same.

As is well known to all skilled in the art, very great practical difficulty has been hitherto encountered in cutting rubber soles with beveled edges; and the object of my invention is to produce a machine by which soles, especially beveled-edge rubber soles, are readily and cheaply cut.

My invention consists, mainly, in the combination, with a clamp for the stock, of a track, which corresponds to the form of article to be cut and a knife which is adapted to travel in a path determined by the track. Minor features of my invention are set forth hereinafter.

In the drawings, which show a machine embodying my invention in the best form now known to me, A is the frame, and A' the main shaft. In the upper part of frame A is a fixed stud, $a$, on which pulleys $a'$ $a^2$ rotate together. Stud $a$ also carries a compound arm, $d$ F, the section $d$ and the section F being jointed together by a shaft, $b$, upon which pulleys $b'$ $b^2$ are fixed. The outer end of section F carries a shaft, $h$, having a pulley, $h'$, fixed to it and also a gear, $i$, fixed to it. Stud $a$ carries the foot-holder C. The foot D is secured in holder C, and preferably approximates the shape of the piece of stock to be cut out, (in this case a sole,) and has on its upper surface a groove forming the track $f$, by means of which the path of the knife is determined. In the form of machine shown the edge of foot D is formed with a rack, $d'$, and a bevel, $g$.

Knife carrier E is preferably formed of two sections, $e$ $e'$, hinged together by a pin, $m$, as shown in Fig. 5, each section being provided with a pin, $n$, and one section having a spur-gear, $i$, fixed to a shaft, $h$, so that when the tool-carrier is caused to travel the lower ends of pins $m$ and $n$ move in the groove, which in this case forms the track $f$, and the gear $i$ meshes with the rack $d'$ on foot D.

The stock-support B is preferably provided on its lower surface with pins 3, which slide in holes in frame A. A rocker-shaft, $c'$, mounted in frame A, has fixed to it cams $c$, which sustain the support B and force the support upward against foot D when treadle 1 is depressed, the treadle being connected with the rocker-shaft $c'$ in a way too well known to require description.

The operation of my machine is as follows: Stock being placed on support B, and the support forced upward to clamp the stock against the foot D, motion from the shaft A' is imparted to pulleys $a'$ $a^2$ on shaft $a$, and as pulley $a^2$ is belted to pulley $b'$ on shaft $b$, and pulley $b^2$ on shaft $b$ is belted to pulley $h'$, fast to shaft $h$, the knife-carrier E, guided by the track $f$, is caused to travel in a path corresponding to the track entirely around the foot D, so that a piece of stock corresponding in shape to that of the track is cut from the stock, the knife E' in the carrier projecting downwardly through the stock operated on, for when the support B is moved upward the stock upon it is pressed against the point of the knife, which is thereby caused to penetrate through the stock.

It will be obvious that the compound arm $d$ F, being hinged as above described, is free to bend, so that the pins $m$ $n$ of tool-holder E move easily in the groove which forms the track $f$, and the spur-gear $i$ is kept in contact with the rack $d'$. The sole being cut, pressure on treadle 1 is relieved, and support B falls, carrying the cams $c$ with it until they are arrested by the levers 4, mounted in frame A, and adapted to be swung to enter notches $c'$ in cams $c$.

When foot D is to be replaced by a foot of different size or style, the levers 4 4 are moved out of engagement with the cams $c$, so that the cams fall still lower and the support B moves downwardly to give ample room for removing and replacing the foot D. The foot D is preferably provided with dovetailed lugs $d^2$, to engage the dovetailed ends of the foot-holder C, the foot-holder and foot being secured together, say, by cams $e^2$, as shown in Fig. 7.

In order to cut a beveled sole edge, as well as one at right angles to the top or bottom surface of the sole, tool-holder E is provided with a series of mortises, $e^3$, one vertical and the rest inclined, in which the knife E' is readily secured by a set-screw, $e^4$, as seen best in Fig. 4.

Treadle 2 controls a friction-clutch on main shaft A' in a way too well known to require particular description, and the belt from main shaft A' leads from pulley G over idlers $k$ to pulley $a'$.

I am aware of Thurston's patent, No. 17,408, dated May 26, 1857; Ives's patent, No. 149,659, dated April 14, 1874; and Cable's Patent, No. 303,804, dated August 19, 1884, and disclaim all that is described in them.

What I claim is—

1. In a sole-cutting machine, the combination of stock-clamp B D, track $f$, corresponding to the form of the article to be cut, knife E', and means, substantially such as described, for causing the knife to travel in a path determined by the track $f$, substantially as and for the purpose set forth.

2. In combination, support B, foot D, knife-carrier E, knife E', secured in the carrier, the foot D being formed with a track, $f$, and rack $d$, and the carrier being provided with pins $m\ n$, and spur-gear $i$, substantially as and for the purpose set forth.

3. Support B, foot D, knife carrier E, and knife E', secured in carrier E, foot D, having a track, $f$, and rack $d$, and carrier E, having pins $m\ n$, and gear $i$, in combination with arm $d$ F, hinged at $b$ and provided with pulleys $a'$ $a^2$ $b'$ $b^2$ $h'$, and shafts $a\ b\ h$, all substantially as and for the purpose set forth.

4. The knife-carrier E, herein described, made up of two sections, $e\ e'$, hinged together and provided with pins $m\ n$, and gear $i$, substantially as and for the purpose set forth.

WILLARD F. WELLMAN.

Witnesses:
 EDWARD S. BEACH,
 JOHN R. SNOW.